United States Patent
Cummings et al.

(10) Patent No.: US 10,222,445 B2
(45) Date of Patent: Mar. 5, 2019

(54) SYSTEM IN WHICH A PHASED ARRAY ANTENNA EMULATES LOWER DIRECTIVITY ANTENNAS

(71) Applicant: Maxtena, Inc., Rockville, MD (US)

(72) Inventors: Nathan Cummings, Gaithersburg, MD (US); Stanislav Licul, Washington, DC (US); Carlo DiNallo, San Carlos, CA (US)

(73) Assignee: Maxtena, Inc., Rockville, MD (US)

( * ) Notice: Subject to any disclaimer, the term of this patent is extended or adjusted under 35 U.S.C. 154(b) by 698 days.

(21) Appl. No.: 14/683,540

(22) Filed: Apr. 10, 2015

(65) Prior Publication Data

US 2016/0093950 A1    Mar. 31, 2016

Related U.S. Application Data

(60) Provisional application No. 62/056,731, filed on Sep. 29, 2014.

(51) Int. Cl.

| | |
|---|---|
| *H01Q 3/00* | (2006.01) |
| *G01S 3/74* | (2006.01) |
| *H01Q 3/04* | (2006.01) |
| *H01Q 25/00* | (2006.01) |
| H01Q 3/26 | (2006.01) |
| H01Q 3/38 | (2006.01) |
| H01Q 11/08 | (2006.01) |
| H01Q 21/06 | (2006.01) |
| G01S 3/14 | (2006.01) |

(52) U.S. Cl.
CPC ............ *G01S 3/74* (2013.01); *H01Q 3/04* (2013.01); *H01Q 25/00* (2013.01); *G01S 3/14* (2013.01); *H01Q 3/26* (2013.01); *H01Q 3/385* (2013.01); *H01Q 11/08* (2013.01); *H01Q 21/061* (2013.01)

(58) Field of Classification Search
CPC .. G01S 3/74; G01S 3/14; H01Q 3/385; H01Q 3/04; H01Q 3/26; H01Q 11/08; H01Q 21/061; H01Q 25/00
USPC .................................................. 342/359, 372
See application file for complete search history.

(56) References Cited

U.S. PATENT DOCUMENTS

| | | | | |
|---|---|---|---|---|
| 4,920,348 A * | 4/1990 | Baghdady | ............... | G01S 1/08 342/374 |
| 5,233,358 A * | 8/1993 | Murphy | ............... | H04B 7/2041 342/371 |
| 5,241,319 A * | 8/1993 | Shimizu | ............... | H01Q 1/3275 342/358 |
| 8,587,495 B2 * | 11/2013 | Faraone | ............... | H01Q 1/521 343/850 |

(Continued)

*Primary Examiner* — Chuong P Nguyen
(74) *Attorney, Agent, or Firm* — Patents and Licensing LLC; Daniel W Juffernbruch

(57) ABSTRACT

A system includes a phased array antenna that is used to emulate antennas that have larger solid angle coverage and lower gain compared to a single beam of the phased array antenna. This is achieved by switching between beams of the phased array antenna while receiving a wireless communication signal and summing representations of signal energy received using the different beams. The system can be used to narrow down the angular coordinates of a transmitting satellite by emulating antenna patterns that cover portions of a search space. The system can also be used to determine a channel discriminator (e.g., frequency, code, time slot) that defines a signal being transmitted.

7 Claims, 16 Drawing Sheets

(56) References Cited

U.S. PATENT DOCUMENTS

| | | | | |
|---|---|---|---|---|
| 8,681,070 B2 * | 3/2014 | DiNallo | ................ | H01Q 11/08 |
| | | | | 343/853 |
| 9,118,294 B2 * | 8/2015 | Mochizuki | ........ | H04W 52/0245 |
| 9,793,596 B2 * | 10/2017 | Hyde | .................... | H01Q 1/241 |
| 2011/0065391 A1 * | 3/2011 | Shiotsuki | ............ | H04B 7/0615 |
| | | | | 455/63.4 |
| 2014/0313073 A1 * | 10/2014 | DiNallo | .................. | H01Q 3/34 |
| | | | | 342/352 |
| 2017/0214135 A1 * | 7/2017 | DiNallo | .................. | H01Q 3/36 |

\* cited by examiner

Y_STEP=0 SLICE SUM

Y_STEP=2 SLICE SUM

1300

SYSTEM IN WHICH A PHASED ARRAY ANTENNA EMULATES LOWER DIRECTIVITY ANTENNAS

RELATED APPLICATION DATA

This application is based on provisional application No. 62/056,731 filed Sep. 29, 2014.

FIELD OF THE INVENTION

The present invention relates generally to wireless communication.

BACKGROUND

Over the past two decades wireless technology has extended telephonic, and data communications to an unprecedented number of persons. Wireless satellite communication is an important means of communication in undeveloped regions of the world that are without an extant communication infrastructure. Satellite communication is invaluable for a variety of user groups such as disaster relief workers, geological prospectors and military personal.

Certain types of communications, such as video telephony, or the transfer of large data sets can benefit from high data rates. A directional antenna incorporated into a user's satellite communication terminal could in principle be of benefit for higher data rate communication because a directional antenna increases the link budget and thus allows a greater information symbol (e.g., bit) rate to be sustained within a prescribed transmitter power limit.

A problem with using a directional antenna instead of a fixed pattern, low gain (e.g., omnidirectional) antenna is that when a terminal equipped with a directional antenna is turned on there is in many cases no a priori knowledge of the correct pointing direction to the satellite and unlike a low gain antenna the directional antenna must be pointed (within a certain tolerance) toward the satellite in order to sustain communications with the satellite.

A phased array antenna is a type of directional antenna with no moving parts—it is steered electronically. Without the need for mechanisms to adjust the azimuth and zenith of the pointing directions, phased array antennas can generally be made smaller and lighter.

The capacity of a satellite system can be increased by defining multiple channels using one or more channel discriminators such as frequency, time slot and channel defining code. If a phased array antenna system were to be used in a system with a large number channels, the signal acquisition time would be greatly increased because a receiver would need to check each channel discriminator for each of many beam directions of the phased array antenna.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 18:
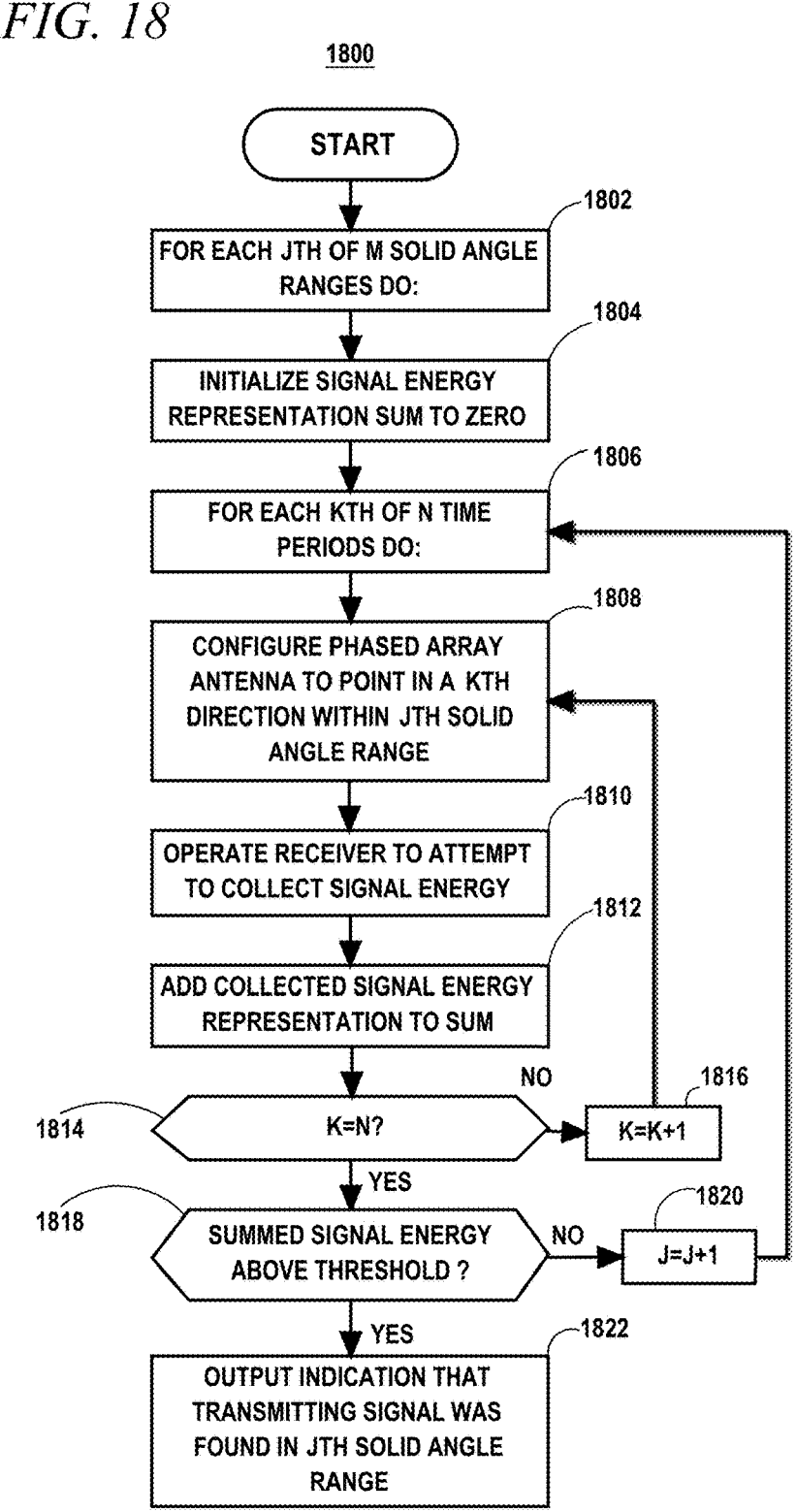
Figure 19:
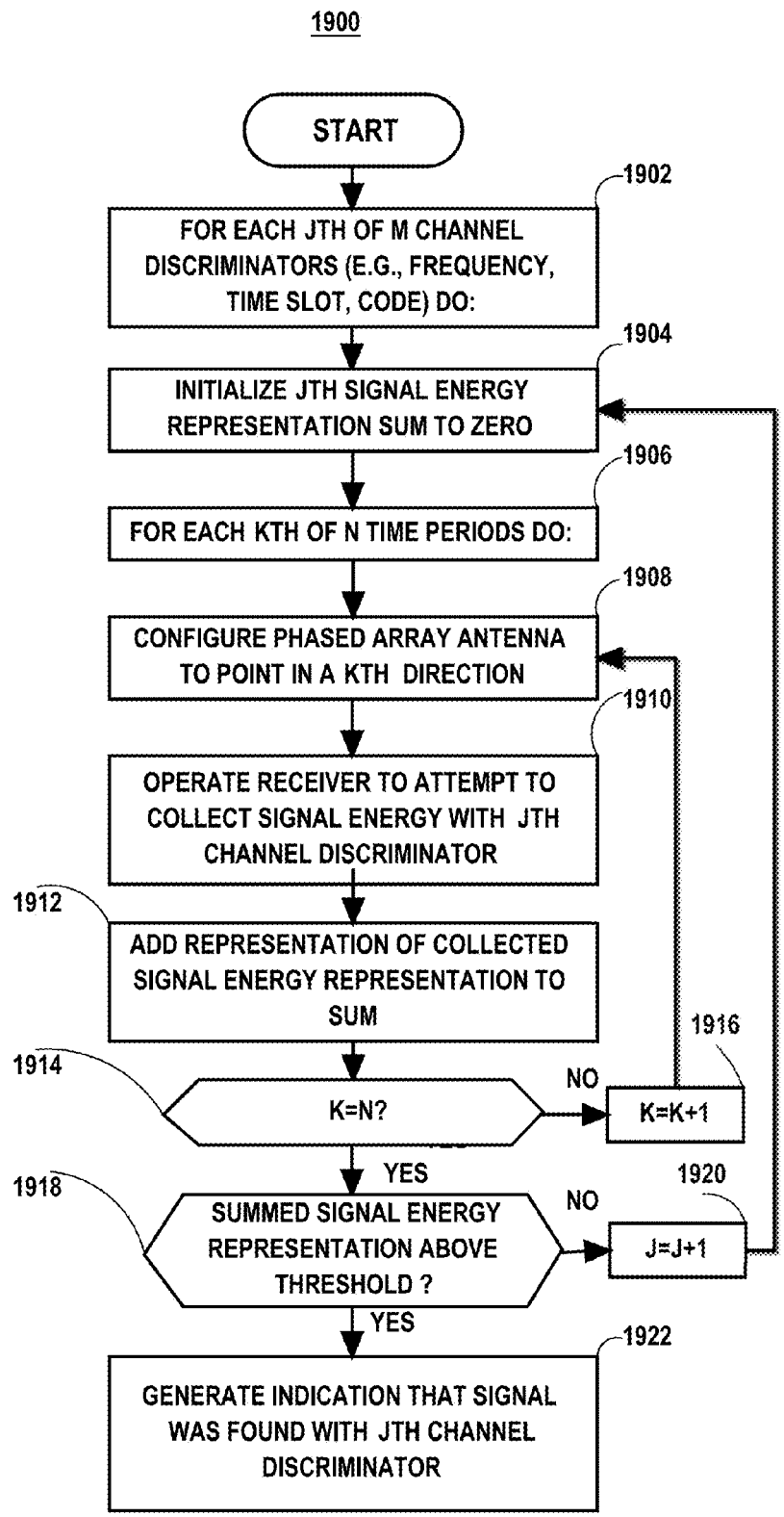
Figure 20:
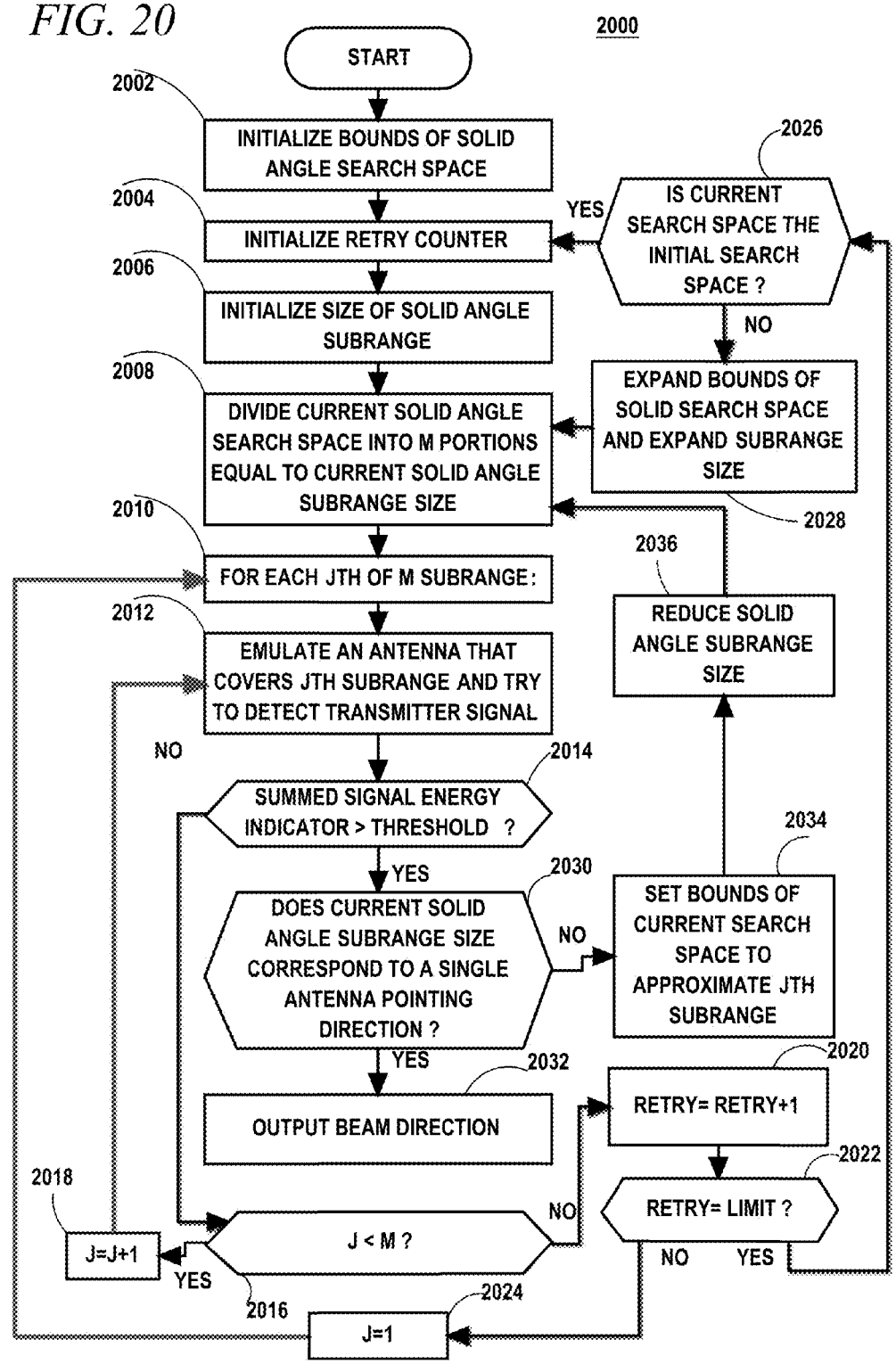
Figure 21:
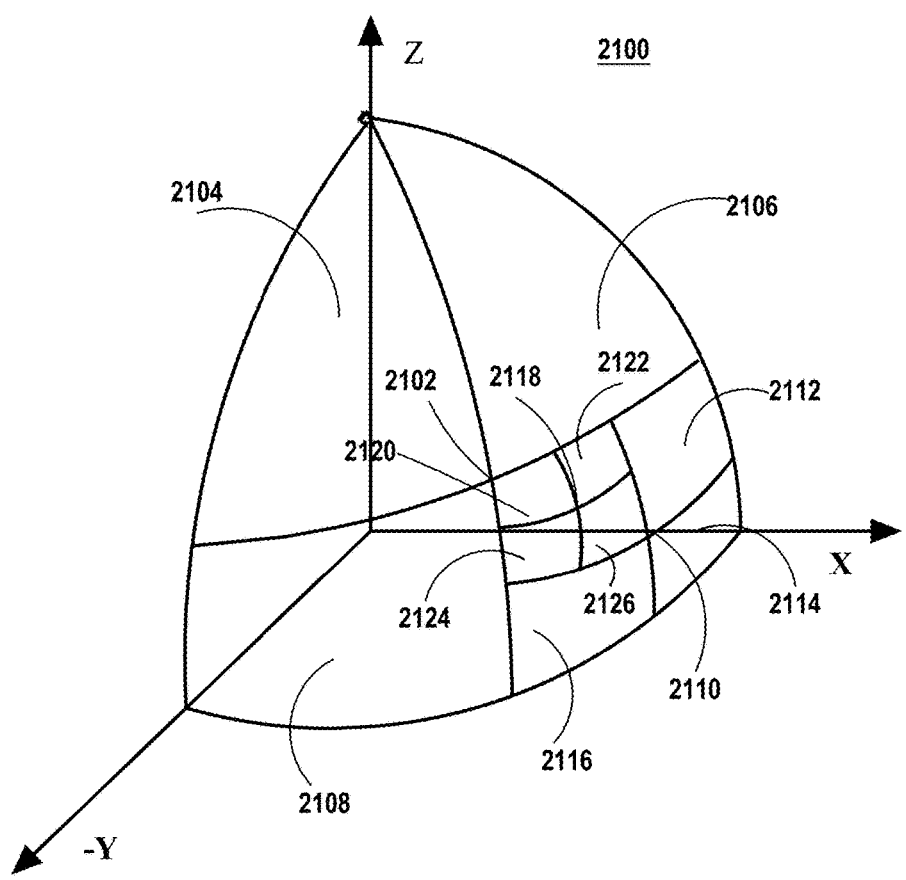

FIG. 18 is flowchart of a method of narrowing down the direction to a signal transmitting source according to an embodiment of the invention;

FIG. 19 is a flowchart of a method of determining a channel discriminator (e.g., frequency, code, time slot) characterizing a signal being transmitted by emulating an omnidirectional antenna;

FIG. 20 is a flowchart of a recursive angular domain search performed by emulating progressively smaller solid angle gain patterns with a phased array antenna according to an embodiment of the invention; and FIG. 21 shows a 3-D coordinate system with various solid angle regions marked to illustrate the operation of recursive angular domain search shown in FIG. 20.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to phased array antenna systems that emulate lower gain antennas and methods for finding the direction to a transmitter. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
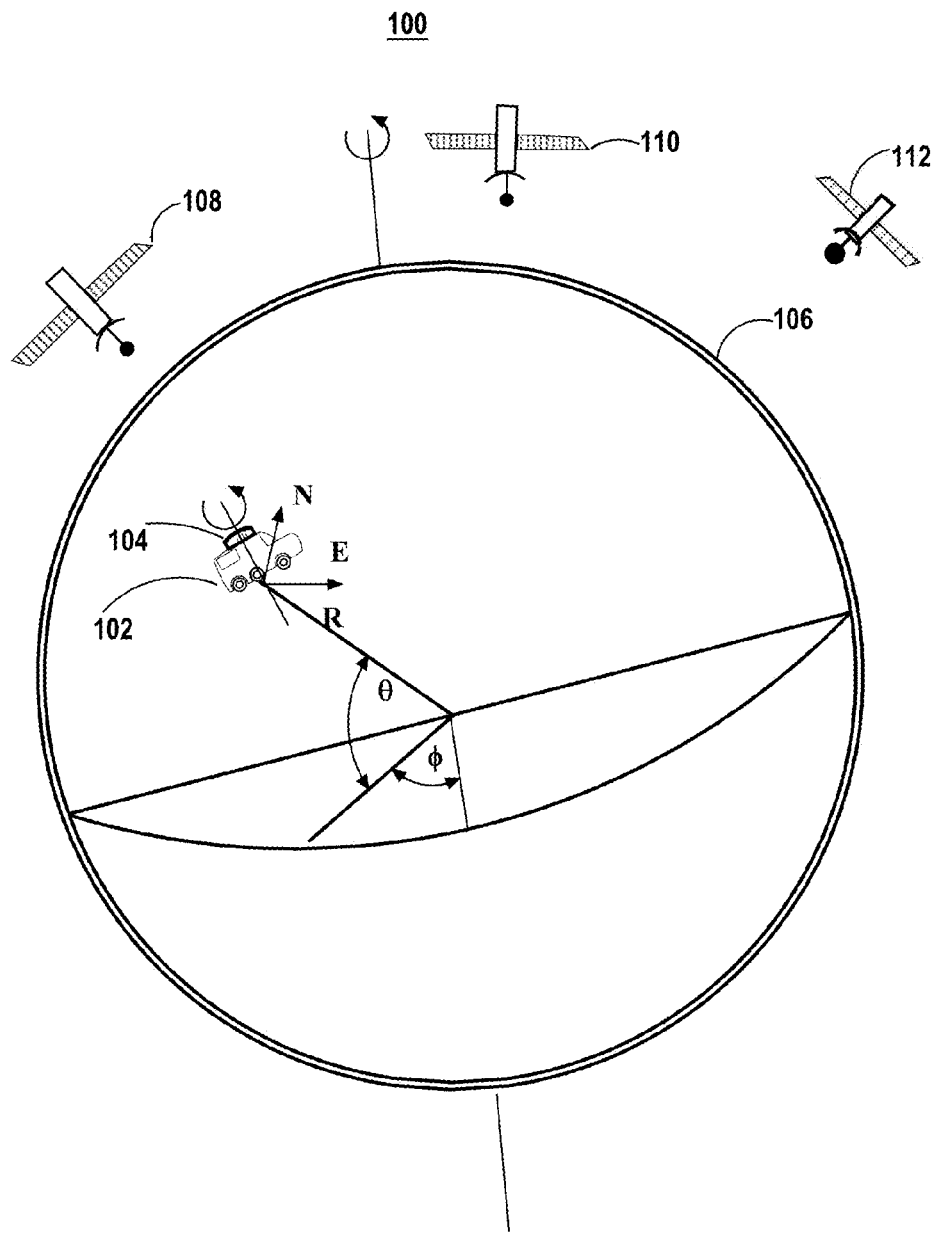
FIG. 1 is a schematic representation of a satellite communication system according to an embodiment of the invention.

FIG. 1 is a schematic representation of a satellite communication system 100 according to an embodiment of the invention. A vehicle 102 on which a satellite communication subscriber unit 104 is mounted is located at a position on the Earth 106. The position of the vehicle 102 is variable and is described by latitude θ and longitude φ shown in FIG. 1. The orientation of the vehicle 102 which can be assessed in a local (e.g., North, East, Down) coordinate system is also variable.

The system 100 includes a constellation of communication satellites including a first communication satellite 108, a second communication satellite 110 and a third communication satellite 112. The system 100 can include additional communication satellites (not shown). In certain embodiments the communication satellites 108, 110, 112 are in an orbit that is closer to the Earth 106 than a geosynchronous satellite. A lower orbit avoids communication lag, and requires less transmit power and so is beneficial. However, a non-geosynchronous orbit, and the variability of the position and orientation of the vehicle 102 means that angular position of any of the satellites 108, 110, 112 from the perspective of the vehicle 102 can vary widely and is not necessarily known, a priori.

Embodiments of the invention described below, provide a phased array antenna for the subscriber unit 104. A phased array antenna is an electronically steerable directional antenna. While, as discussed in the background section a directional antenna offers advantages in terms of link budget, an issue is that a directional antenna must be properly oriented in order to realize such advantages, and such orientation must, in many cases be achieved without the benefit of a priori knowledge of the satellite direction.

Figure 2:
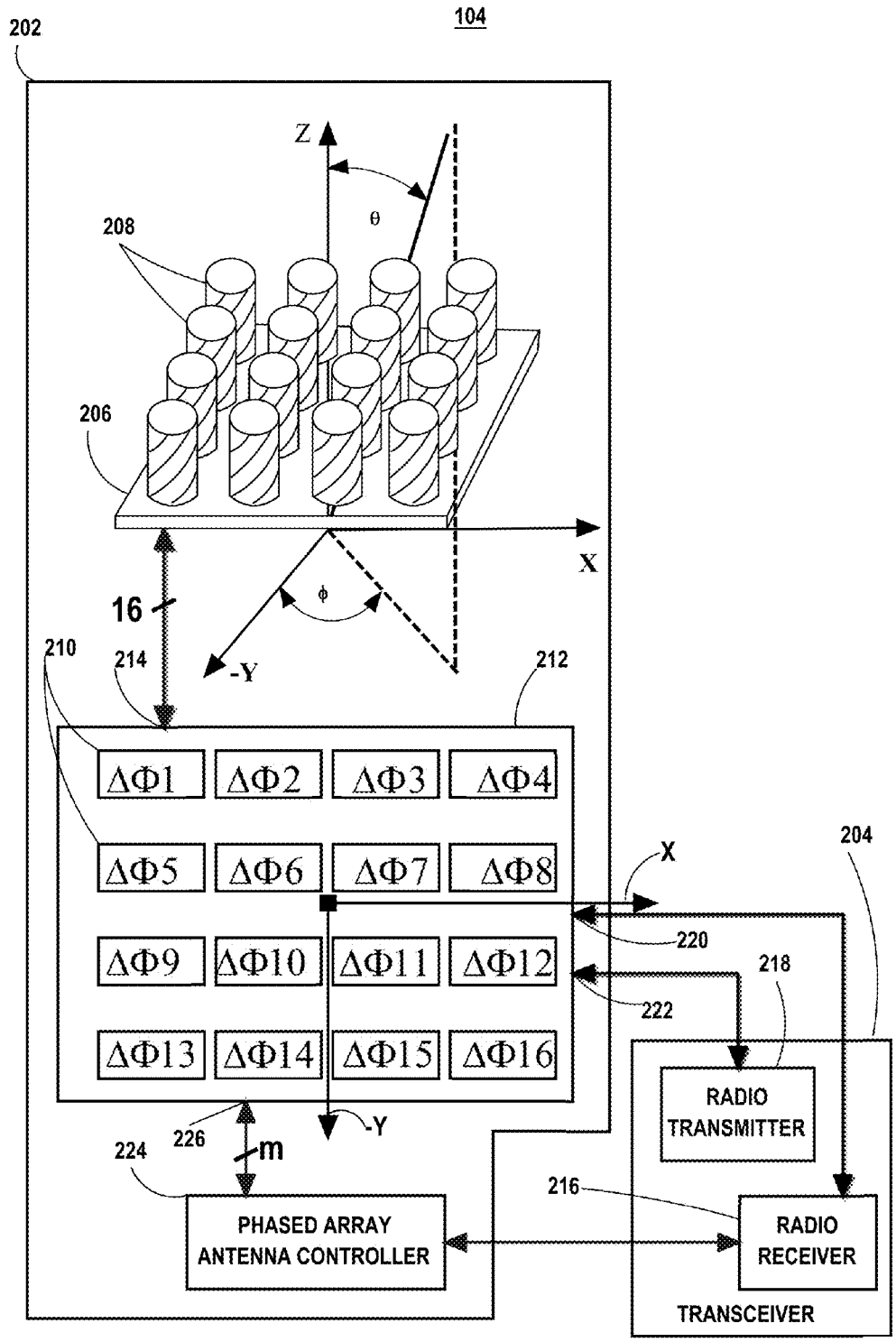
FIG. 2 is a schematic representation of a satellite communication subscriber unit according to an embodiment of the invention.

FIG. 2 is a schematic representation of the satellite communication subscriber unit ("subscriber unit") 104 according to an embodiment of the invention. The subscriber unit 104 includes a phased array antenna 202, coupled to a transceiver 204.

The phased array antenna 202 includes an antenna element array 206 that includes a set of antenna elements 208 (only two of which are numbered to avoid crowding the drawing). In this embodiment the antenna elements 208 are laid out in a 2-D square grid pattern, however other arrangements, such as concentric circles of elements, or elements distributed in 3-space are also possible. In this embodiment there are sixteen antenna elements arranged in four-by-four array, however alternatively a different number of antenna elements 208 can be used. In this embodiment the antenna elements are quadrafilar helical antennas, however other types of elements including but not limited to patch antennas, or dielectric resonator antenna elements can also be used. An X-Y-Z coordinate system, including an indication of a spherical coordinate system zenith angle θ, and an azimuth angle φ is shown superimposed on the antenna element array 206.

Each of the antenna elements 208 is coupled to a phase shifter 210 (only two of which are numbered to avoid crowding the drawing) of a phase shifter array 212 via one of a set of antenna interface ports 214 of the phase shifter array 212. Alternatively a phase shift system in which certain phase shift elements contribute to the phase shift applied to multiple antenna elements 208 is used. Such an alternative may not have a distinct phase shifter dedicated to each antenna element 208. According to certain embodiments the phase shifters 210 are digital phase shifters, which can shift the phase of signals by discrete amounts that are a multiple of a minimum phase shift increment (e.g., 22.5°, 11.25°). The phase shifter array 212 can include a combining/dividing network (not shown) that sums/splits the signal from/to the transceiver 204. The phased array antenna 202 is capable of forming directivity patterns (also referred to as "beams") pointed in multiple directions. The angular width of such beams is dependent on the size of the antenna element array 206, relative to the wavelength of operation. According to certain embodiments the minimum phase shift increment is chosen such that adjacent beams are so close in angle that they cross at their −3 dB points or closer, in other words the adjacent beams are highly overlapping. This allows complete coverage of large solid angle range (e.g., a 0° to 60° zenith angle cone) with no gaps in coverage. X and −Y axes are superimposed on the phase shifter array 212. These X and −Y axes correspond to the X and −Y axes of the antenna element array 206 and can be used to establish an association of the phase shifters 210 in the phase shifter array 212 with the elements 208 of the antenna element array 206.

The transceiver 204 includes a receiver 216 and a transmitter 218. The receiver 216 is coupled to a radio receiver interface port 220 of the phase shifter array 212 through which it can receive radio signals that pass from the antenna element array 206 through the phase shifter array 212. The transmitter 218 is similarly coupled to a transmitter interface port 222. The radio receiver interface port 220 and the transmitter interface port 222 may, in certain embodiments be combined.

According to an alternative embodiment rather than having a single transceiver 204 coupled through the phase shifter array 212 to the multiple antenna elements 208, an individual transceiver can be provided for each antenna element, and phase shifting performed in the digital domain by a Digital Signal Processor (DSP).

The phased array antenna 202 also includes a phased array controller 224. The phased array controller 224 is coupled to a set of phase shift control inputs 226 of the phase shifter array 212. The phased array controller controls the phase shift that the phase shifter array 212 establishes between the radio receiver interface port 220 and each antenna element 208 of the antenna element array 206. The gain pattern (beam) generated by the phased array antenna 202 can be steered in different directions by applying different phase shifts to the antenna elements 208. In particular, a first phase term establishes a phase difference equal to a certain integer multiple, "x_step" (e.g., 1×, 2×, etc.) of the minimum phase increment (e.g., 22.5°, 11.25°) between adjacent elements proceeding in the X-axis direction of the antenna element array 206, and a second phase term establishes another phase difference equal to a certain integer multiple "y_step" of the minimum phase increment between adjacent elements proceeding in the Y-axis direction of the antenna element array 206. Note that x_step and y-step can also have the value of zero or negative integer values. An expression for the phase applied to each antenna element 208 can be written as:

$$e_{phase_{i,j}} = (i-1)*x_{step}*\text{phase}_{step} + (j-1)*y\_step*\text{phase\_step} - 0.5*(\text{array\_size}-1)*\text{phase\_step}*(x\_step + y\_step) \quad \text{EQU. 1:}$$

where, $e\_phase_{i,j}$ is a phase shift applied to an antenna element identified by a pair of indices i, j, i is an index indicating the X-position of the antenna element 208, with i=1 corresponding to the most positive X-coordinate, j is an index indicating the Y-position of the antenna element 208, with j=1 corresponding to the most positive Y-coordinate, array size being the number of rows and number of columns in a square array (which is equal to 4 for the embodiment shown in FIG. 2), phase_step being the minimum phase increment, e.g., 22.5°.

Note that the last term of equation one causes the "phase center"—the point at which the phase is zero to be located at the center of the array.

Figure 3:
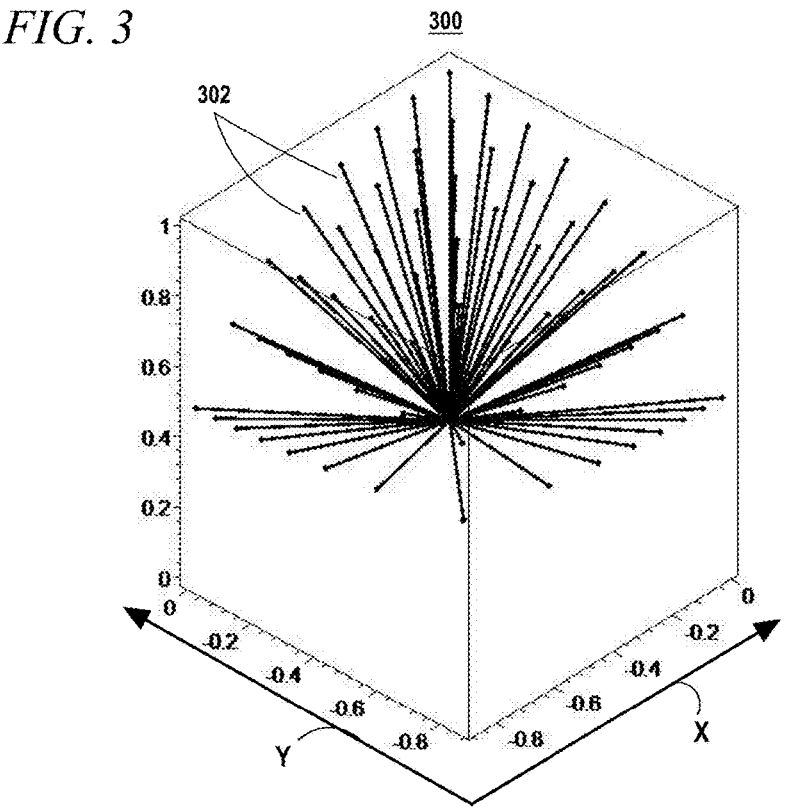
FIG. 3 is a 3-D plot including a set of vectors representing approximate pointing directions of a phased array antenna included in the satellite communication subscriber unit shown in FIG. 2.

FIG. 3 is a 3-D plot 300 including a set of vectors 302 (only two of which are numbered to avoid crowding the drawing) representing approximate pointing directions of the phased array antenna 202 for various values of x_step and y_step in the case that the minimum phase increment is 22.5°. Note that only pointing directions for one of four quadrants is shown. These directions correspond to x_step and y_step values that are either zero or positive valued, so the X, and Y components of the pointing directions have negative values. This example is for an antenna element array 206 having an element-to-element spacing of λ/2 corresponding to 180° in phase. Dividing 180° by the minimum phase increment of 22.5° yields 8. Therefore an x_step value of 8 in combination with a y_step value of 0 or a y_step value of 8 in combination with an x_step value of 0 would correspond to a beam direction in the X-Y plane (a zenith angle θ of 90°). However at a polar angle of 90° the antenna element pattern may be quite low. If x_step and y_step values are limited to absolute values of 7 or less, the zenith angle θ of the directions vary from 0° to 60°.

Figure 4:
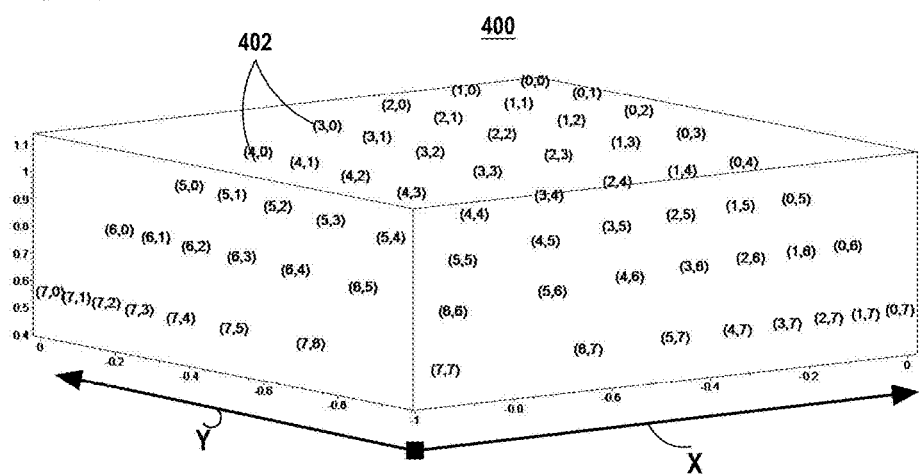
FIG. 4 is a 3-D plot in which the directions shown in FIG. 3 are identified by pairs of labels indicating X direction and Y direction integer multiples of a minimum phase shift increment required to point the phased array antenna in the direction.

FIG. 4 is a 3-D plot 400 in which the directions shown in FIG. 3 are identified by pairs of x_step and y_step values 402 (only two of which are labeled to avoid crowding the drawing), in the format (x_step, y_step). A vector from the origin (0,0,0) of the X-Y-Z coordinate system to the location of each pair of labels gives the approximate direction of peak gain if the indicated x_step and y_step values are used. It is noted that certain sequences of the form (c,n) and (n,c) where c is held constant and n takes on successive integer values, correspond to a series of pointing directions of constant azimuth angle φ while others do not. For example the sequences (0,n) and (n,0) correspond to fixed azimuth angles of 180° and 270° (measured from the positive X-axis) but sequences (1,n), (2,n), (n,1) and (n,2), for example do not. Also the sequence of (n,n) corresponds to a constant azimuth angle of 225°. In certain embodiments of the invention, signal energy collected using gain patterns described by sequences of the form (c,n) or (n,c) can be summed to emulate a synthetic gain pattern. In other embodiments signal energy collected using gain patterns described by combinations of x_step values and y_step values with both varying can be summed to emulate a synthetic gain pattern. For example, energy collected with all pointing directions of the form (n+i, m+j) with n, and m being fixed and l and j being allowed to vary over prescribed integer ranges can be summed to emulate a synthetic gain pattern. Alternatively a conical search in which the zenith angle is fixed and the azimuth angle is varied (e.g., over 2π) can be emulated by selected a set of (x_step, y_step) pairs that yield beam directions close to a preselected zenith angle.

Figure 5:
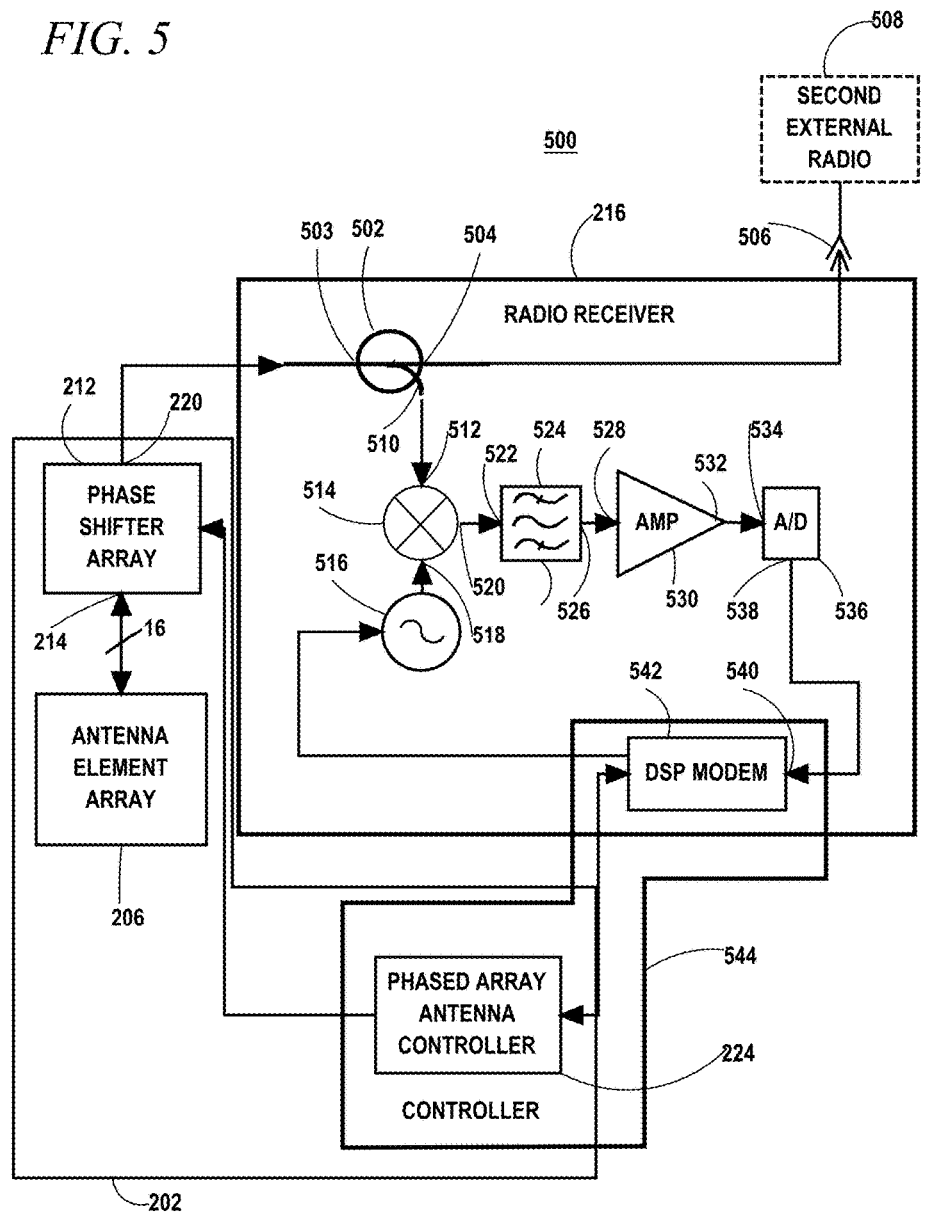
FIG. 5 is a block diagram of a wireless receiver system that is included in the satellite communication subscriber unit shown in FIG. 2 according to an embodiment of the invention.

FIG. 5 is a block diagram of a wireless receiver system 500 that is included in the satellite communication subscriber unit 104 shown in FIG. 2 according to an embodiment of the invention. The antenna element array 206, phase shifter array 212, phased array antenna controller 224 and radio receiver 216 discussed above are shown in FIG. 5. As shown in FIG. 5, the radio receiver 216 includes a directional coupler 502 that includes an input port 503 coupled to the radio receiver interface port 220 of the phase shifter array 212. The directional coupler 502 divides signal energy received from the radio receiver interface port 220 into two portions. One portion of the signal energy is made available via a first directional coupler output port 504 and a connector 506 to a second, external radio 508. The receiver 216 may be located in a common housing with the antenna element array 206 and the phase shifter array 212; and the second external radio 508 may be housed in a different housing and located remotely from the receiver 216, the phase shifter array 212 and antenna element array 206. A second portion of the signal energy is coupled via a second directional coupler output port 510 to a first input port 512 of a mixer 514. A local oscillator 516 is coupled to a second input port 518 of the mixer 514. The mixer 514 outputs a downconverted (e.g., intermediate frequency) signal at an output port 520. The output of the mixer 514 includes signal energy and information derived from the signal received via the directional coupler 502 and the phase shifter array 212 from the antenna element array 206. The output port 520 of the mixer 514 is coupled to an input port 522 of a bandpass filter 524. The bandpass filter 524 serves to remove extraneous high frequency components. An output port 526 of the bandpass filter 524 is coupled to an input port 528 of an amplifier 530. An output port 532 of the amplifier 530 is coupled to an input port 534 of an analog-to-digital converter (A/D) 536. The A/D 536 serves to digitize the down converted signals received from the bandpass filter 524 via the amplifier 536. An output port 538 of the A/D 536 is coupled to an input 540 of a Digital Signal Processor (DSP) modem 542. The DSP modem 542 serves to demodulate and decode the digitized signal received from the ND 536. The output of the process of demodulating the digitized signal can be used as a representation of received signal energy.

The DSP modem 542 is communicatively coupled to the phased array antenna controller 224 and together therewith forms a larger controller 544. A received signal strength indication, which is an indication of received signal energy, can be communicated by the DSP modem 542 to the phased array controller 224 so that the phased array controller 224 is able to determine if a current directivity pattern (beam) of the phased array antenna 202 is aimed towards or approximately towards a transmitting signal source. Either of the DSP modem 542 and phased array controller 224 can run an overall control program and control the other. As discussed further below, in certain embodiments, the overall control program causes the wireless receiver system 500 to sum an indication of signal energy that is collected using multiple directivity patterns of the phased array antenna 202 and thereby emulate antennas with directivity patterns that have a lower gain and broader angular coverage compared to a single directivity pattern of the phased array antenna 202. A "summer" in the form of dedicated circuits or program code can be included in the DSP modem 542 or the phased array controller 224.

Figure 6:
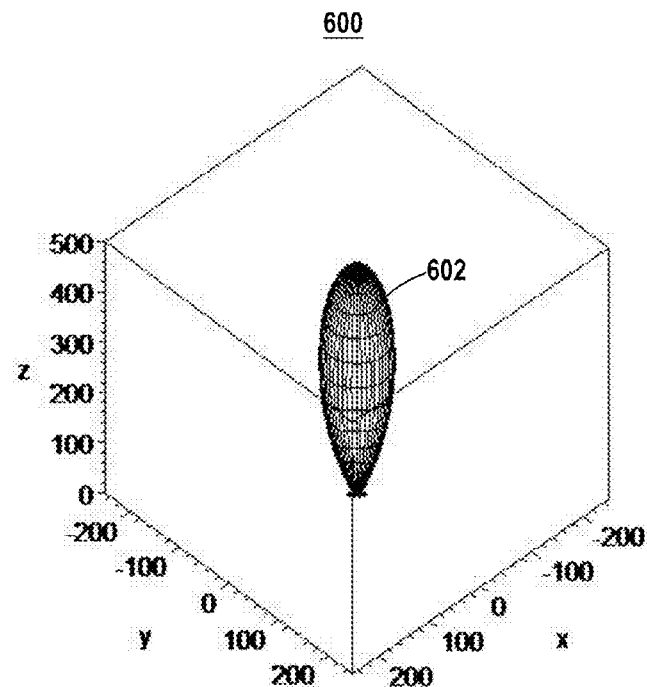
FIG. 6 is a 3-D plot showing a directivity pattern for the phased array antenna shown in FIG. 2 when operating in a first configuration.

FIG. 6 is a 3-D plot 600 showing a first directivity pattern 602 for the phased array antenna 202 shown in FIG. 2 when operating in a first configuration. Gain is the product of the directivity and the antenna efficiency. The directivity pattern that is realized when the phased array antenna is operating in a given configuration with given x_step and y_step values can be referred to as a "beam". FIG. 6 shows the directivity pattern obtained with x_step=y_step=0 such that all the antenna elements 208 receive signals at the same phase. For the directivity pattern shown in FIG. 6 and other directivity patterns shown in other figures and described below the antenna elements 208 were assumed to be spaced by λ/2 in both the X and Y directions.

Figure 7:
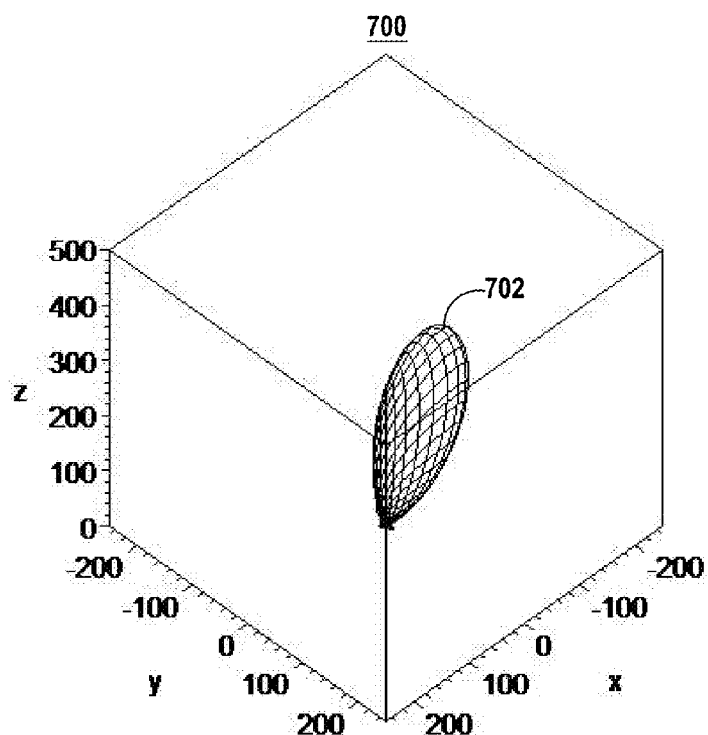
FIG. 7 is a 3-D plot showing a directivity pattern for the phased array antenna shown in FIG. 2 when operating in a second configuration.

FIG. 7 is a 3-D plot 700 showing a second directivity pattern 702 for the phased array antenna 202 shown in FIG. 2 when operating in a second configuration. The second directivity pattern is obtained with x_step=0 and y_step=2. In this case the beam direction of maximum gain is in the Z-Y plane and the polar angle of maximum gain is about 14°.

Figure 8:
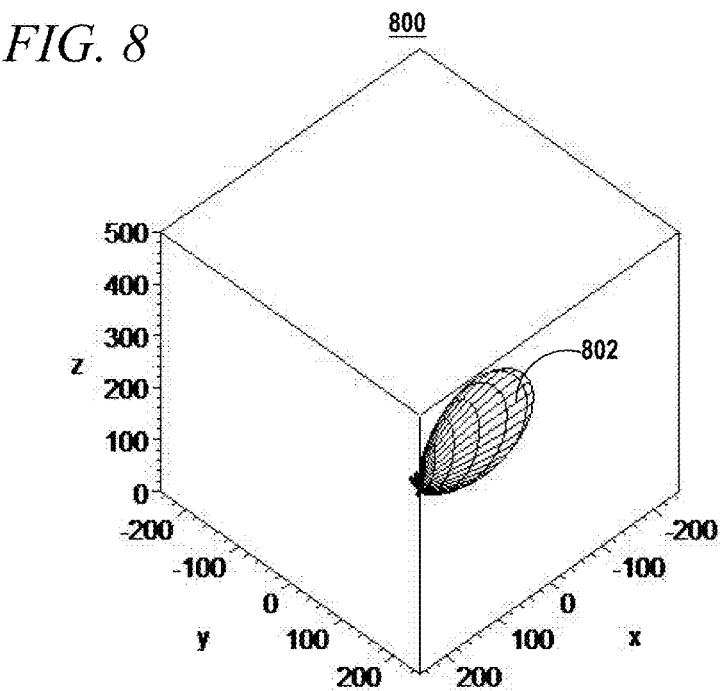
FIG. 8 is a 3-D plot showing a directivity pattern for the phased array antenna shown in FIG. 2 when operating in a third configuration

FIG. 8 is a 3-D plot 800 showing a third directivity pattern 802 for the phased array antenna 202 shown in FIG. 2 when operating in a third configuration. The third directivity pattern is obtained with x_step=0 and y_step=4. In this case the beam direction of maximum gain is also in the Z-Y plane and the polar angle of maximum gain is about 30°.

Figure 9:
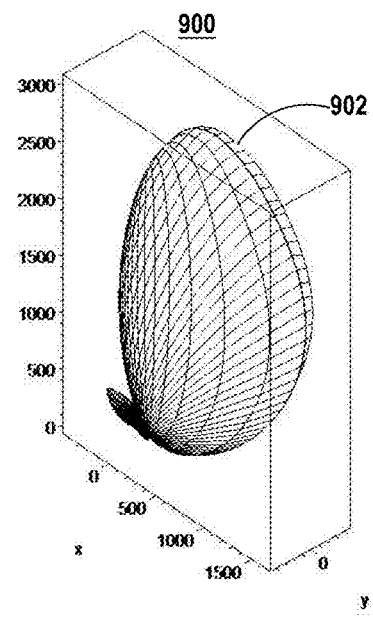
FIG. 9 is a 3-D plot showing a first effective sum of directivity patterns of multiple configurations of the phased array antenna shown in FIG. 2 that is realized by summing the signal energy obtained while operating in the multiple configurations.

FIG. 9 is a 3-D plot 900 showing a first effective sum 902 of directivity patterns of multiple configurations of the phased array antenna 202 that is realized by summing indications of received signal energy obtained while operating the phased array antenna in the multiple configurations each of which produces a specific directivity pattern. The sum is taken over directivity patterns with y_step fixed at zero and x_step taking on integer values from 0 to 7 inclusive. Although the phased array antenna 202 does not at any given instant exhibit the directivity pattern equal to the effective sum 902 shown in FIG. 9, the wireless receiver system 500 effectively emulates an antenna having a directivity equal to the effective sum. This is achieved by summing an indicator of signal energy that is received while the phased array antenna 202 is configured to produce different directivity patterns. The sum can be written as:

$$\sum_{t=1}^{T} RSSI(SIG(\varphi_t, \theta_t))$$

where, RSSI is a received signal strength operator,
SIG is a received signal which is a function of:
$\theta_t$ a zenith angle parameter; and
$\varphi_t$ an azimuth angle parameter,
$\theta_t$ and $\varphi_t$ identify a particular directivity pattern according to the angle coordinates of its maximum value; and
t—the subscript on $\theta_t$ and $\varphi_t$ is the summation index and is also and index referring to a period of time during which $\theta_t$ and $\varphi_t$ are valid.

Note that there is a one-to-one relationship between pairs of angular coordinates ($\theta_t$, $\varphi_t$) and pairs (x_step, y_step) which also specify a particular directivity pattern. Note that RSSI is an indicator of received signal energy for each period identified by summation index t. Note that for the purpose of the summation the RSSI should be converted to a linear absolute scale as opposed to being represented in dBm.

As discussed further below, the phased array antenna 202 can be rapidly switched between directivity patterns, such that the signal energy indicator that is summed is collected within the duration of single code sequence, or in certain embodiments within the duration of single symbol period of a code sequence. The code sequence may for example be included in a broadcast channel, a beacon signal or in the preamble of a communication channel, or in other parts of communication channel messages. Alternatively, the signal energy is extracted from an unmodulated section of communication messages that are used for satellite discovery or frequency locking or other purposes.

Figure 10:
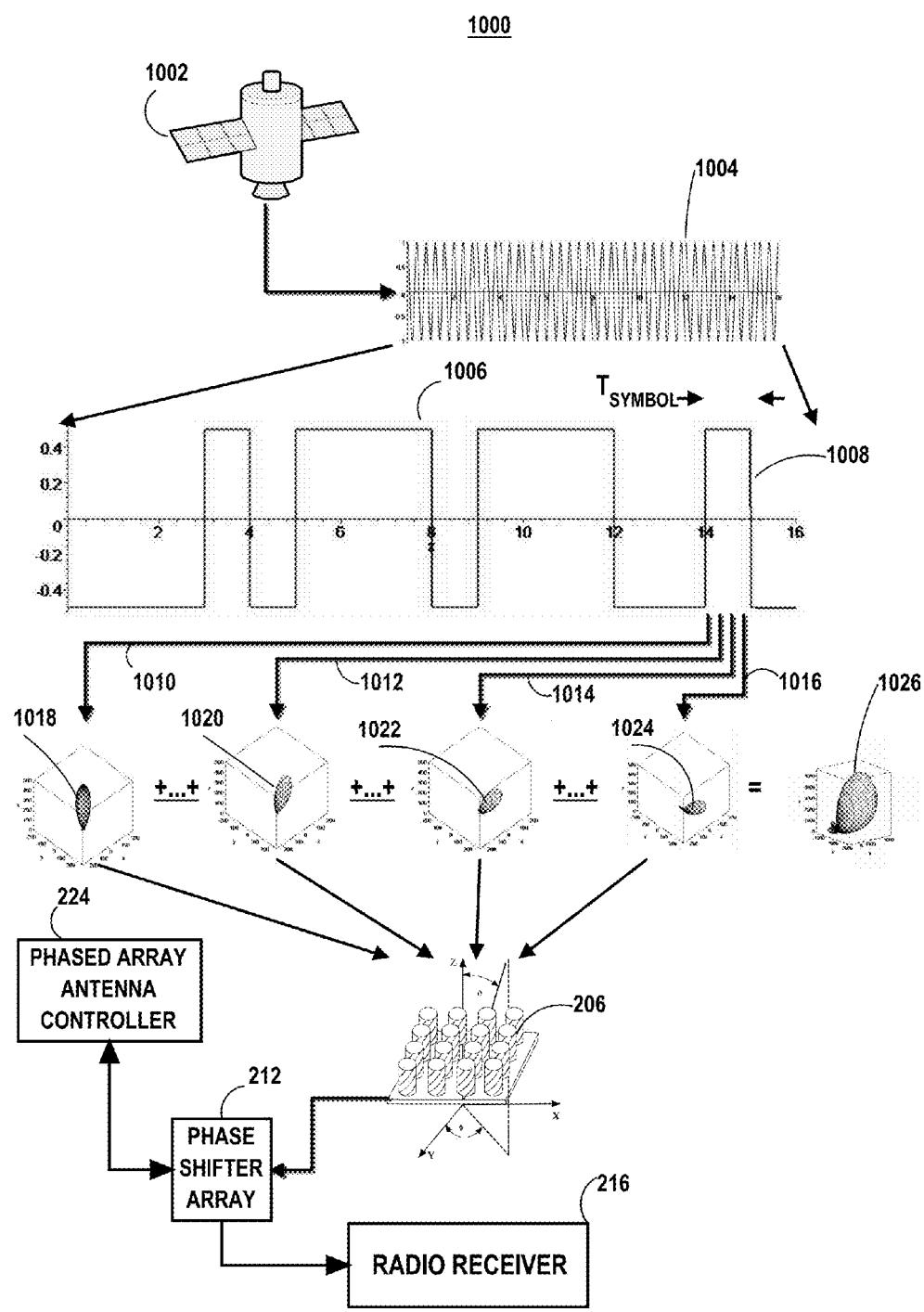
FIG. 10 is a schematic representation of a first mode of operation of the wireless receiver system shown in FIG. 5 and included in the satellite communication subscriber unit shown in FIG. 2 according to an embodiment of the invention.

FIG. 10 is a schematic representation of a first mode of operation of the wireless receiver system 500 shown in FIG. 5 and included in the satellite communication subscriber unit 104 shown in FIG. 2 according to an embodiment of the invention. FIG. 10 depicts a system 1000 that includes a satellite 1002 that transmits a phase shift key (PSK) modulated signal 1004, in this case a binary phase shift (BPSK) modulated signal, but alternatively a quadrature phase shift key (QPSK) modulated signal or a signal with another type of modulation. The PSK modulated signal 1004 is modulated with (and hence carries) a baseband signal 1006 that includes binary information symbols, e.g., a symbol 1008. In a digital communication system each symbol encodes one or more bits of information. Each symbol is transmitted with a certain amount of energy which is a product of the transmit power of the satellite 1002 (accounting for any internal losses) and the duration of the symbol. The symbol duration $T_{symbol}$ is indicated on the baseband signal 1006 plot in FIG. 10. An electromagnetic wave that carries the PSK modulated signal 1004 will have a certain field strength and related area power density when it reaches the antenna element array 206. Each individual directivity pattern (beam) of the phased array antenna 202 covers a small fraction of the hemisphere of solid angle facing upward toward the sky and so is unlikely to have sufficient gain to receive a PSK modulated signal 1004 coming from a random direction. A limited number of beam directions which are close to the direction of the PSK modulated signal will be able to receive significant signal energy. In certain operating scenarios for the system 1000, the direction to the satellite is not known a priori. In such operating scenarios, in order to narrow down the direction to the satellite, an antenna directivity pattern with a larger solid angle coverage 1026 is emulated. This is achieved by sampling each symbol, e.g., the symbol 1008, with multiple directivity patterns 1018, 1020, 1022, 1024 of the phased array antenna 202 and summing together the signal energies or signal representations based thereon that are collected using the different directivity patterns. Summing can be performed by the radio receiver, for example in the DSP modem 542 (FIG. 5) of the radio receiver, or by the phased array controller 224. Connectors 1010, 1012, 1014 and 1016 represent different signal samples that are extracted from the same symbol 1008 using different directivity patterns (beams) 1018, 1020, 1022, 1024 of the phased array antenna 202. Each signal sample is based on received signal energy that is collected over an interval that is a fraction of the symbol period $T_{symbol}$. The summing process effectively emulates an antenna directivity pattern with a larger solid angle coverage 1026, even though that gain pattern 1026 is not produced at any given instant. In this way a portion of the sky that is significantly larger than that covered by a single directivity pattern (e.g., 1018, 1020, 1022, 1024) can be checked for active transmissions within the relatively short duration of the symbol period $T_{symbol}$. While, FIG. 10 shows one particular larger solid angle effective sum 1026, other effective sums can be composed to cover other selected relatively large solid angle portions. For example four directivity patterns that each cover one quadrant of the sky, e.g., azimuth angle ranges 0°-90°, 90°-180°, 180°-270° and 270°-360° can be emulated. Other ways in which emulated larger solid angle directivity patterns can be defined are discussed above in reference to FIG. 4.

Figure 11:
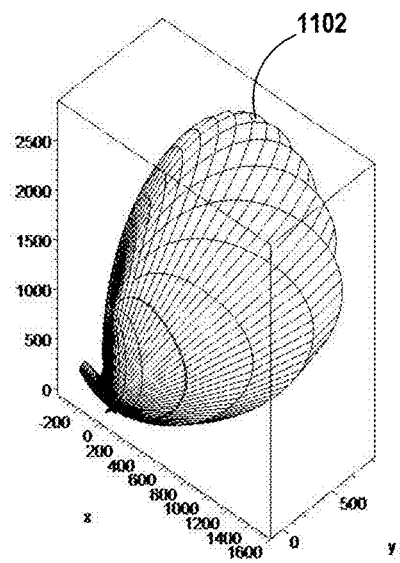
FIG. 11 is a 3-D plot showing a second effective sum of directivity patterns of multiple configurations of the phased array antenna shown in FIG. 2 that is realized by summing the signal energy obtained while operating in the multiple configurations.

FIG. 11 is a 3-D plot 1100 showing a second effective sum 1102 of directivity patterns of multiple configurations of the phased array antenna 202 shown in FIG. 2 that is realized by summing the signal energy obtained while operating in the multiple configurations. The effective sum directivity pattern 1102 shown in FIG. 11 is a sum over directivity patterns (beams) with y_step fixed at a value of 2 and x_step taking on integer values from 0 to 7 inclusive.

Figure 12:
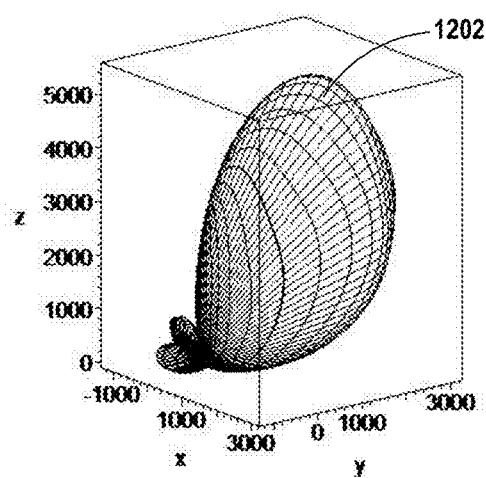
FIG. 12 is a 3-D plot showing a third effective sum of directivity patterns of multiple configurations of the phased array antenna shown in FIG. 2 that is realized by summing the signal energy obtained while operating in the multiple configurations.

FIG. 12 is a 3-D plot 1200 showing a third effective sum of directivity patterns 1202 of multiple configurations of the phased array antenna 202 shown in FIG. 2 that is realized by summing the signal energy obtained while operating in the multiple configurations. The effective sum directivity pattern shown in FIG. 12 is a sum of all combinations x_step and y_step integer values varying from zero to negative seven. The effective sum directivity pattern shown in FIG. 12 covers one quadrant of a hemisphere of solid angle facing upward and is centered at an azimuth angle of 45° halfway between the positive X and Y axes. Using positive values of either x_step or y_step or both one may obtain analogous patterns for the remaining quadrants. Each effective sum directivity pattern such as those shown in FIG. 9, FIG. 11 and FIG. 12, emulates a lower gain, larger solid angle coverage antenna directivity pattern.

Figure 13:
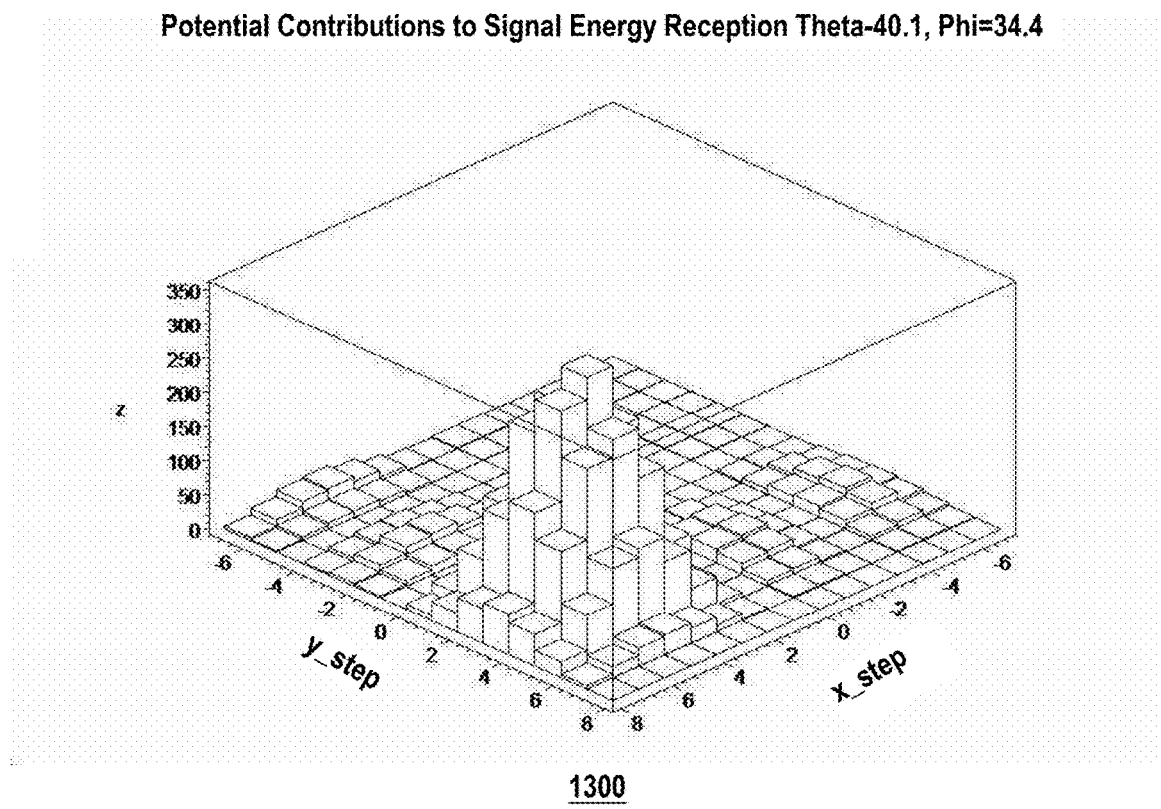
FIG. 13 is 3-D bar chart of directivity in a particular direction ($\theta=40.1°$ $\phi=34.4°$) for each pointing direction configuration of the phased array antenna shown in FIG. 2, wherein each pointing direction configuration is identified by X direction and Y direction integer multiples of a minimum phase shift increment required to point the phased array antenna in the corresponding direction.

FIG. 13 is 3-D bar chart 1300 of directivity in a particular transmitter source (e.g., satellite) direction specifically θ=40.1°, φ=34.4°, for each pointing direction configuration of the phased array antenna 202 shown in FIG. 2, wherein each pointing direction configuration is identified by X direction (x_step) and Y direction (y_step) integer multiples of a minimum phase shift increment that are required to point the phased array antenna in the corresponding direction. X_step and y_step vary from −7 to 7. The corner of each bar that has the lowest x_step and y_step values gives the correct x_step and y_step values for the bar. FIG. 13 is for a four-by-four antenna element array such as 202 shown in FIG. 2 but in particular in which the inter-element spacing is λ/2, and with a minimum phase shift increment produced by the phase shifter array 212 of 22.5°. In this case the solid angle coverage of each directivity pattern (beam) is relatively large compared to steps in pointing direction which are a nonlinear function of the minimum phase shift increment 22.5°, thereby resulting in the situation as shown in which multiple directivity patterns (beams) will pick up significant signal energy for the transmitter (e.g., satellite) with angular coordinates at θ=40.1°, φ=34.4°. There is significant overlap between adjacent directivity patterns. The same situation will occur for different transmitter angular coordinates. Therefore in such situations when summing the energy collected with multiple directivity patterns in the course of emulating a larger solid angle coverage antenna pattern, multiple individual directivity patterns (beams) can make contributions to the summed received energy of the same order of magnitude (within a factor of 10 or each other).

Figure 14:
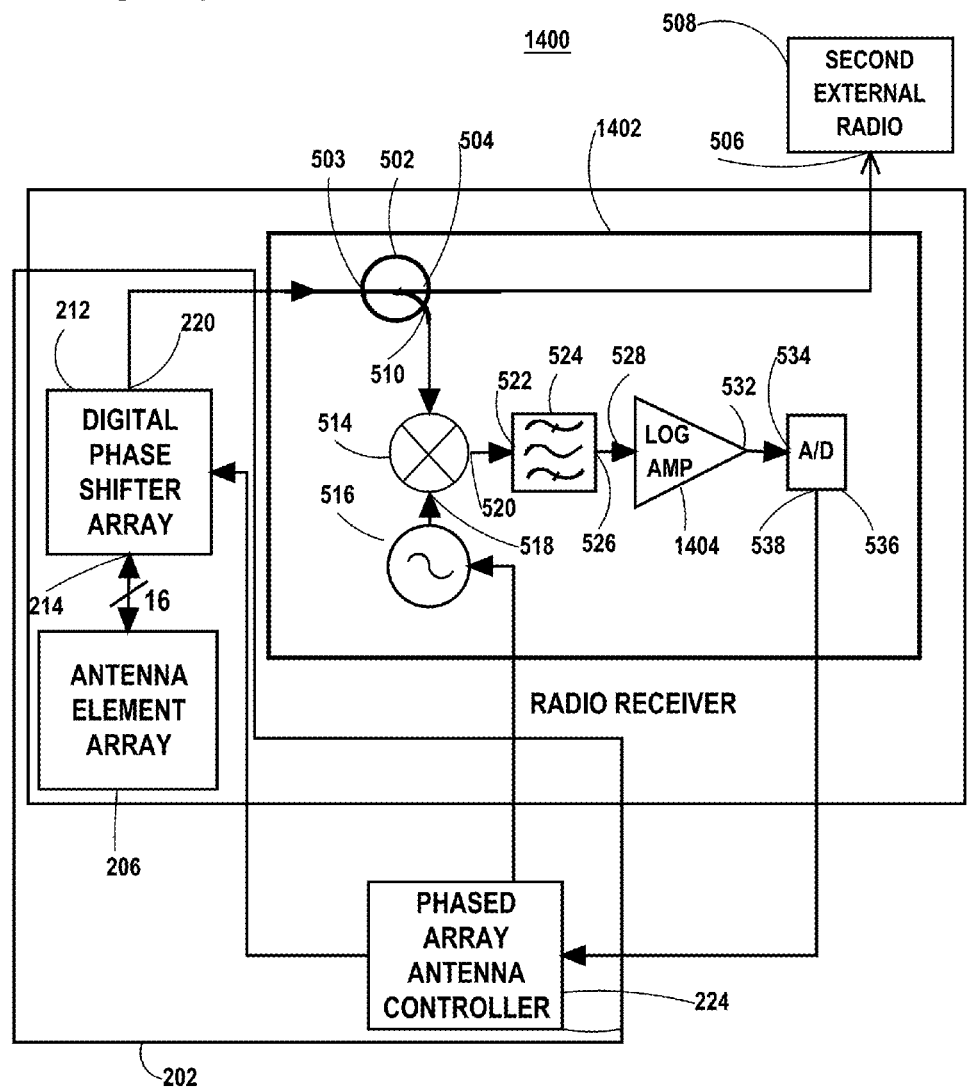
FIG. 14 is a block diagram of a wireless receiver system that is included in the satellite communication subscriber unit shown in FIG. 2 according to another embodiment of the invention.

FIG. 14 is a block diagram of a wireless receiver system 1400 that is included in the satellite communication subscriber unit 104 shown in FIG. 2 according to another embodiment of the invention. The system 1400 includes a receiver 1402 that differs from the receiver 216 in that instead of the amplifier 530, the receiver 1402 includes a log amplifier 1404. The receiver 1402 also differs from the receiver 216 in that no DSP modem 542 is included, because the receiver 1402 is only used to detect signals not to fully demodulate and decode those signals. In the system 1400 full demodulation and decoding is performed by the second external radio 508.

Figure 15:
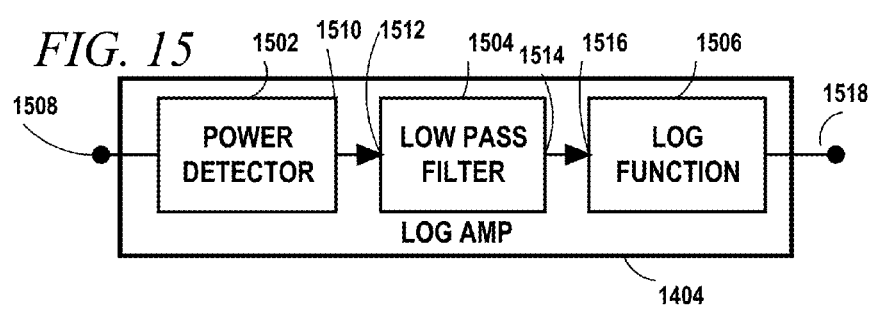
FIG. 15 is a block diagram of a log amplifier used in the wireless receiver system shown in FIG. 14.

One attribute of the log amplifier 1404 is that it accepts signals having a very large range of magnitude and produces therefrom an output restricted to a smaller range. This is useful because radio signals can have widely varying power due to the variation in distance to the transmitter among other factors. FIG. 15 is a block diagram of the log amplifier 1404 used in the wireless receiver system shown in FIG. 14 according to one embodiment of the invention. As shown in FIG. 15, the log amp 1404 includes three stages coupled in series including a power detector 1502, a low pass filter 1504, and a log function circuit 1506. The power detector 1502 includes an input 1508 which is coupled to the output port 526 of the bandpass filter 524. The power detector 1502 includes an output 1510 coupled to an input 1512 of the lowpass filter 1504 and the lowpass filter 1504 includes an output 1514 coupled to an input 1516 of the log function 1506. The log function 1506 includes an output 1518 which is coupled to the input port 534 of the A/D 536.

Figure 16:
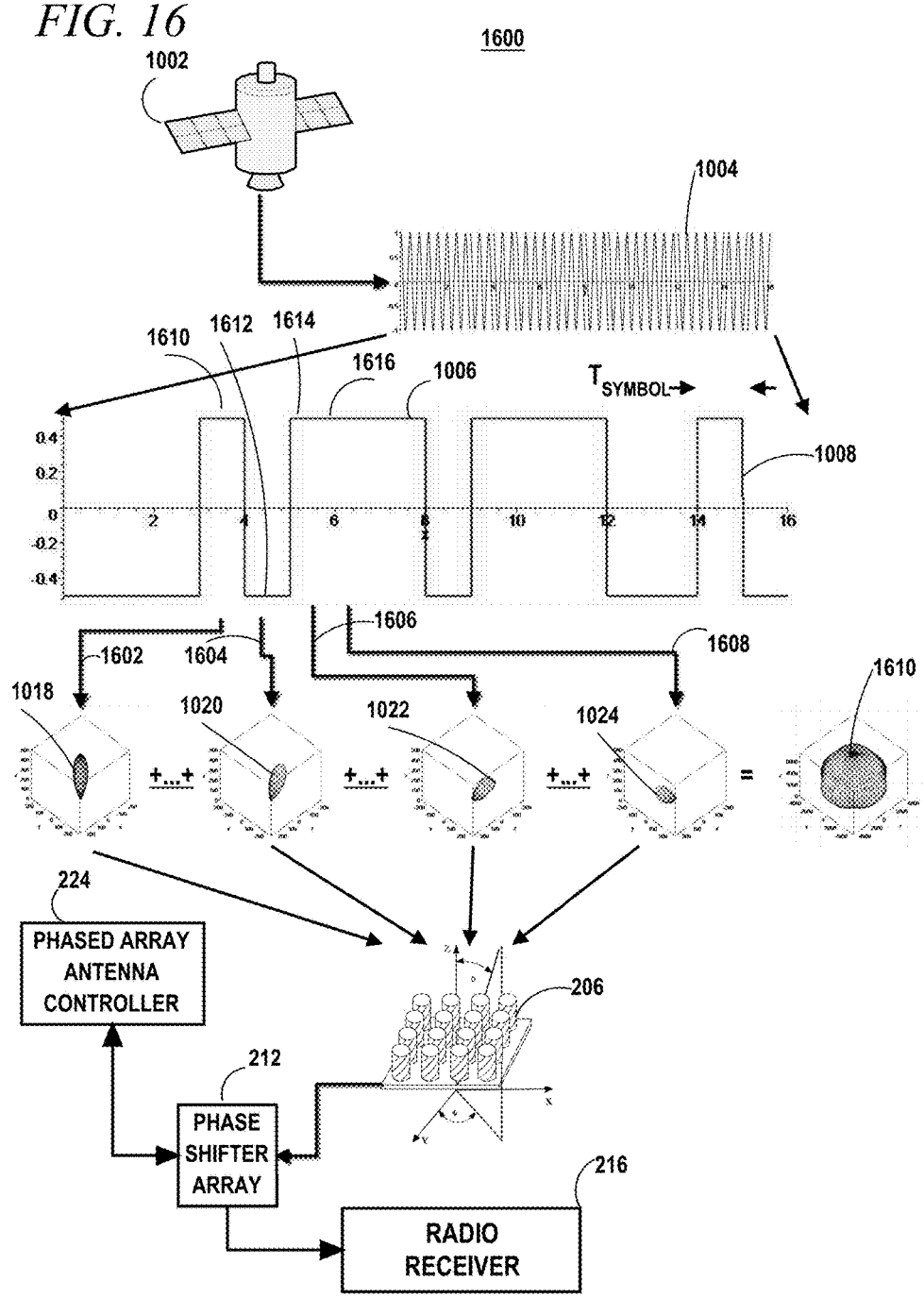
FIG. 16 is a schematic representation of a second mode of operation of the wireless receiver system shown in FIG. 5 and included in the satellite communication subscriber unit shown in FIG. 2 according to an embodiment of the invention.

FIG. 16 is a schematic representation of a second mode of operation of the wireless receiver system 500 shown in FIG. 5 and included in the satellite communication subscriber unit 104 shown in FIG. 2 according to an embodiment of the invention. FIG. 16 depicts a system 1600 that differs from the system 1000 shown in FIG. 10 in respect to the mode of operations as will presently be described. In the system 1000 multiple samples, each collected from a single transmitted symbol 1008 using a different directivity pattern of the phased array antenna 202 are obtained and representations of the signal energy in each sample are summed together. (Note that the amplitude of a demodulated signal whether in digital or analog form is one type of representation of the signal energy.) In contrast, in the system 1600, representations of signal energy from several samples, e.g., 1602, 1604, 1606, 1608 each obtained from a different baseband symbol 1610, 1612, 1614, 1616 are summed together. The symbols include a consecutive series including a first symbol 1610, a second symbol 1612, a third symbol 1614 and a fourth symbol 1616. Each of the samples 1602, 1604, 1606, 1608 can collect energy from an entire information symbol, substantially the entire information symbol or a fraction thereof. According to one embodiment the symbols 1602, 1604, 1606, 1608 from which the summed samples 1602, 1604, 1606, 1608 are taken are part of the same data frame. Note that in FIG. 16 an emulated directivity pattern 1610 is an omnidirectional pattern, as opposed to the fraction of a hemisphere pattern emulated directivity pattern 1026 shown in FIG. 10. (Note that in antenna engineering the term "omnidirectional" does not mean that the pattern is perfectly isotropic.) One reason to emulate an omnidirectional pattern 1610 is to determine a channel discriminator such as a frequency, or a channel defining code, e.g., Direct Sequence Spread Spectrum (DSSS) code of a transmitted signal. The full hemisphere omnidirectional pattern 1610 can be emulated repeatedly while different channel discriminators are used and attempts made to receive a signal. Alternatively, a hemisphere fraction directivity pattern such as 1026 is emulated in the system 1600. The hemisphere fraction directivity patterns are useful in narrowing down the angular coordinates of the transmitter (e.g., satellite).

Figure 17:
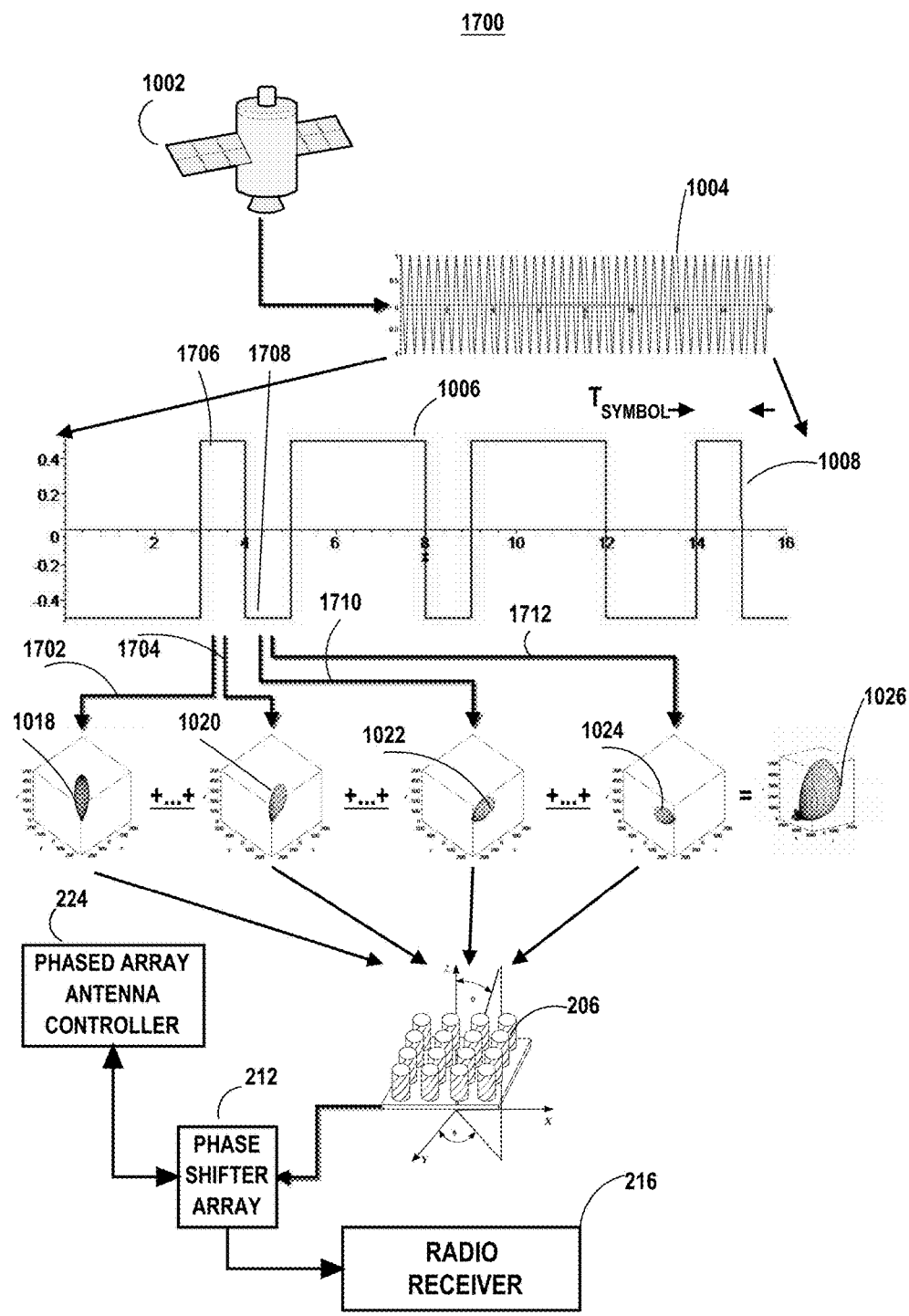
FIG. 17 is a schematic representation of a third mode of operation of the wireless receiver system shown in FIG. 5 and included in the satellite communication subscriber unit shown in FIG. 2 according to an embodiment of the invention.

FIG. 17 is a schematic representation of a third mode of operation of the wireless receiver system 500 shown in FIG. 5 and included in the satellite communication subscriber unit 104 shown in FIG. 2 according to an embodiment of the invention. FIG. 17 depicts a system 1700 that can be viewed as a hybrid of the system 1000 and the system 1600 in so far as the mode of operation. In the system 1700 representations of symbol energy that are collected with different directivity patterns 1018, 1020, 1022, 1024 including multiple samples collected from the same symbol using different directivity patterns and samples collected from different information symbols. A first sample 1702 and a second sample 1704 are collected from a first information symbol 1706, using a first directivity pattern 1018, and a second directivity pattern 1020 respectively. Also a third sample 1710 and a fourth sample 1712 are collected from a second information symbol 1708 using a third directivity pattern 1022 and a fourth directivity pattern 1024 respectively. Representations of, at least, the first sample 1702, the second sample 1704, the third sample 1708 and the fourth sample 1710 are summed together in order to emulate the larger solid angle coverage directivity pattern 1026.

According to yet another mode a set of samples includes at least a first sample that includes energy collected from a first symbol and a second symbol using a first directivity pattern; and a second sample that includes energy collected from a third symbol and a fourth symbol using a second directivity pattern; and a representation of energy derived from the first sample is summed with a representation of energy derived from the second sample.

FIG. 18 is flowchart of a method 1800 of narrowing down the direction to a signal transmitting source according to an embodiment of the invention. Block 1802 is the top of a loop that checks each $J^{TH}$ of M solid angle ranges. For example, each $J^{TH}$ solid angle range can be a quadrant spanning 90° of azimuth angle so that M is equal to 4. As another example each $J^{TH}$ solid angle range can be defined by a fixed value of one of x_step or y_step and with the other of x_step and y_step varying over a range of integer values, such as in the case of the emulated directivity patterns shown in FIG. 9 and FIG. 11. If the angular coordinates of a transmitter have already been located in a certain quadrant, each $J^{TH}$ solid angle range could be a fraction of that quadrant. As such, FIG. 18 can be executed recursively, to further narrow down the angular coordinates of a transmitter, until the nearest single directivity pattern (beam) to the transmitter angular coordinates is determined.

In block 1804 a sum of signal energy representations is initialized to zero. Block 1806 is the top of a loop that performs operations during each $K^{TH}$ of N time periods. For each $K^{TH}$ time period, a $K^{TH}$ directivity pattern (beam) is employed. In certain embodiments each $K^{TH}$ time period is less than a symbol period of the signal to be received. According to certain embodiments the time period is sufficiently short that three consecutive time periods fit within 20 milliseconds. In block 1808 the phased array antenna 202 is reconfigured to point to a $K^{TH}$ direction within the $J^{TH}$ solid angle range (e.g., quadrant). In block 1810 the receiver (e.g., 216, 1402) is operated to attempt to collect signal energy. In block 1812 a representation of the collected signal energy (e.g., in binary) is added to the signal energy sum that was initialized in block 1804. In certain embodiments in order to account for variations of gain from beam to beam, the collected signal energy for the $K^{TH}$ beam can be normalized by subtracting the peak gain for the $K^{TH}$ beam (or equivalently dividing by the peak gain for the $K^{TH}$ beam if the peak gain is quantified in linearized form as opposed to the logarithmic dBi). Such normalization is performed prior to adding to the aforementioned sum. Additional normalization by link budget terms, i.e., angle dependent transmitter antenna gain, distance to satellite, which can be tied (by geometry) to the zenith angle of signal at receiver (assuming no tilting of receiver), can also be included.

Decision block 1814 tests if the loop counter K for the loop initialized in block 1806 has been reached its limit N. If not then in block 1816 the loop variable K is incremented and the method 1800 loops back to block 1808 and proceeds as previously described. If on the other hand the outcome of decision block 1814 is affirmative meaning that K=N, then the method 1800 proceeds to decision block 1818 the outcome of which depends on whether the summed signal energy exceeds a threshold. If not then in block 1820 the loop variable J for the loop initialized in block 1802 is incremented and the process 1800 loops back to block 1806 in order to check a next $J^{TH}$ solid angle portion. If on the other hand the outcome of decision block 1818 is affirmative meaning that the summed signal energy is above the aforementioned threshold, the method proceeds to block 1822 in which an indication that a transmitting signal was found in the $J^{TH}$ solid angle portion is output.

FIG. 19 is a flowchart of a method 1900 of determining a channel discriminator characterizing a signal being received by emulating an omnidirectional antenna. Block 1902 is the top of a loop that processes each $J^{TH}$ of M channel discriminators. The channel discriminator may for example be a frequency, a time slot or code such as a DSSS code that characterizes a signal being transmitted. In block 1904 a $J^{TH}$ signal energy representation sum is initialized to zero. The signal energy representation may be a binary value representing received signal strength. Block 1906 initializes a processing loop that reexecutes in each successive $K^{TH}$ of N periods, utilizing each $K^{TH}$ of N directivity patterns. The number N and particular choice of the N directivity patterns may be made to emulate an omnidirectional antenna pattern such as 1610. For example every combination of x_step and y_step may be used. In such a case if x_step and y_step took on all integer values (including zero) with an absolute value of 7 or less there would be the number of directivity patterns N would be equal to 15^2=225. Alternatively, one may sample the search space with less than all possible directivity patterns for example by limiting x_step and y_step to even integers, i.e., 0, ±2, ±4, ±6. Alternatively, the solid angle domain for the search may correspond to less than that covered by an emulated omnidirectional pattern, for example the solid angle domain for the search could be limited to one quadrant.

In block 1908 the phased array antenna 202 is configured to point in a $K^{TH}$ direction by having a $K^{TH}$ directivity pattern that has a peak gain in the $K^{TH}$ direction. In block 1910 a receiver (e.g., 216, 1402) is operated to attempt to collect signal energy. In block 1912 a representation of the collected signal energy (e.g., binary value representing signal strength) is added to the sum that was initialized in block 1904. The added amount may be normalized in the manner discussed above in reference to block 1812. Block 1914 tests if the loop variable K for the loop initialized in block 1906 has reached its limit. If not, then in block 1916 the loop variable K is incremented and the method returns to block 1908 and continues executing as previously described. If on the other hand the outcome of decision block 1914 is affirmative, then the method 1900 proceeds to decision block 1918 which tests if the summed signal energy is above a threshold. If not, then in block 1920 the loop variable J that points to successive channel discriminators (e.g., frequencies, time slots, codes) is incremented and the method 1900 returns to block 1904 and continues executing as previously described. If on the other hand, it is determined in block 1918 that the summed signal energy representation for the $J^{TH}$ channel discriminator is above the predetermined threshold, then the method 1900 branches to block 1922 in which an indication that a signal with the $J^{TH}$ channel discriminator was found is generated. The indication may be read by the controller 544, and in response thereto the radio 216, 1402 can be operated to receive additional signals in the channel identified by the $J^{TH}$ channel discriminator.

FIG. 20 is a flowchart of a recursive angular domain search method 2000 that is performed by emulating progressively smaller solid angle gain patterns with a phased array antenna according to an embodiment of the invention, and FIG. 21 shows a 3-D coordinate system 2100 with various solid angle regions marked to illustrate the operation of recursive angular domain search shown in FIG. 20.

In block 2002 the bounds of a search space are initialized. For example, for a satellite system that transmits signals in the zenith angle range 0° to 60° (as seen from a receiver on earth) the search range can be initialized to a zenith angle of 0° to 60° and an azimuth angle of 0° to 360°. In general the search range may be initialized to the possible range of transmitter angular coordinates for a given system.

In block 2004 a retry counter is initialized, e.g., to zero. The retry counter is used to limit the number of times the search space is repeatedly search. It can also be set to one so that only one attempt is made to find a transmitter in the search space.

In block 2006 the size of a solid angle subrange of the solid angle search space is set. The solid angle search space can be broken up into an integer number of equal sized subranges. For example, initially the subranges can be four solid angle portions having azimuth ranges of 90° and zenith angle ranges of 90°. FIG. 21 shows a quadrant 2102 solid angle subrange that has a zenith angle range from 0° to 90° and an azimuth angle range of 270° to 0°. Alternatively if the initial bounds of the solid angle search space have the zenith angle limited to 0° to 60°, the four solid angle portions could also have the zenith angle limited to 0° to 60°. Four is just an example. There could be for example 8 or 16 or another number of solid angle subranges. In block 2008 the current solid angle search space is divided into a number M of portions each equal to the current solid angle subrange size.

Block 2010 is the top of a loop that processes each successive $J^{TH}$ of the M subranges. In block 2012 an antenna that covers the $J^{TH}$ subrange is emulated by summing multiple directivity patterns (beams) and an attempt is made to detect a transmitting signal. Block 2012 can be performed by executing blocks 1804 to 1816 of the method 1800 shown in FIG. 18.

Next decision block 2014 tests if a summed signal energy indicator indicative of signal energy that was received in block 2012 exceeded a programmed threshold. As discussed above in the context of FIG. 18 the summed representation of signal energy can be a weighted sum. According to a further alternative the threshold to which the summed signal energy indicator is compared in block 2014 can be set for each $J^{TH}$ subrange individually.

If the outcome of decision block 2014 is negative meaning that the received summed signal energy indicator did not exceed the threshold, then the method 2000 branches to decision block 2016 which tests if the index J that points to successive subranges has reached its limit M. If not then in block 2018 J is incremented and thereafter the method loops back to block 2012 and continues processing as previously described.

If on the other hand, the outcome of decision block 2014 is affirmative meaning that all subranges had been checked, then the method branches to block 2020 which increments the retry counter, and then proceeds to decision block 2022 which tests if the retry counter has reached a predetermined limit.

If the outcome of decision block 2022 is negative meaning that further retries are permitted, then the method 2000 branches to block 2024 in which the counter J that points to successive subranges is reset to 1 and thereafter the method 2000 loops back to block 2016 and continues processing as previously described.

If the outcome of decision block 2022 had been affirmative meaning that the retry limit had been reached, then the method 2000 branches to decision block 2026 in which the tests if the current search space is the initial (largest) search space. If the outcome is affirmative meaning that the search space cannot be further expanded then the method will branch to block 2004 and retry a search of the initial search space. If the outcome of decision block 2026 is negative then the method 2000 will branch to block 2028 in which the search space will be expanded and the subrange size will be increased. For example if the search space had been the quadrant 2102 shown in FIG. 21 the search space can be expanded to an azimuth range larger than the quadrant, such as an azimuth range 0° to 360°. As shown in FIG. 21 the quadrant 2102 is first divided into four solid angle subranges 2104, 2106, 2108, 2110. Part 2110 is further subdivided. Per block 2028 if the subrange size had been equal to the size of one of the solid angle subranges 2104, 2106, 2108, 2110, the subrange size can for example be reset in block 2028 to size of the quadrant 2102, and the entire search space set to all four quadrants including 2102. After block 2028 the method 2000 proceeds to block 2008 and continues executing as discussed above.

According to an alternative embodiment rather than simply expanding the bounds of the search space in block 2028, the search space can be changed which may include recentering the search space. The search space can be recentered to a new position based on known or expected trajectory of a transmitting satellite that was previously detected with a larger search space.

While the case in which J reaches M without a signal being detected has been discussed above, normally if there is a transmitting satellite to be detected, the outcome of decision block 2014 will be affirmative for a $J^{TH}$ subrange. In such normal case the method 2000 will recursively narrow down the angular coordinates of the transmitting satellite to smaller and smaller solid angle subranges, with each solid angle subrange corresponding to a emulated directivity pattern that is produced by effectively summing multiple directivity patterns (beams) of the phased array antenna 202 until at the last stage the transmitting satellite is localized to within a single beam of the phased array antenna 202.

When the outcome of decision block 2014 is affirmative, the method 2000 proceeds to decision block 2030, the outcome of which depends on whether the current solid angle subrange size already corresponds to the solid angle covered by a single directivity pattern (beam), such as 602, 702, 802. If the outcome of block 2030 is affirmative meaning that the recursive search has succeeded in narrowing down the direction of the transmitting satellite to a single beam, then in block 2032 the beam direction is output. The beam direction, can for example be represented by the x_step and y_step values, or more explicitly by the zenith and azimuth angle.

If on the other hand it is determined in block 2030 that the current solid angle subrange size is larger than that covered by a single directivity pattern, then the method branches to block 2034 in which the bounds of the current search space are set to approximate the $J^{TH}$ subrange, and thereafter proceeds to block 2036 in which the subrange size is reduced, suitably reduced to a fraction of the current subrange size. After block 2036, the method 2000 branches to block 2008 and continues executing as described above.

As shown in FIG. 21 the solid angle subrange 2110 is further divided into four solid angle subranges 2112, 2114, 2116, 2118 and the solid angle subrange 2118 is further divided into four subrange 2120, 2122, 2124, 2126. One possible iterative search scenario is as follows. The initial search space that is set in block 2002 is the 2π steradian hemisphere center on the Z-axis. The initial size of the solid angle subrange that is set in block 2006 0.5π. The first time block 2008 is executed the search space is divided into four 0.5π quadrants including the quadrant 2102 shown in FIG. 21. A transmitting satellite is in the quadrant 2102 so the first time the loop commenced in block 2010 is executed when the index J points to quadrant 2102 it is found in block 2014 that the received energy meets the threshold. Because the quadrant 2102 is larger than the solid angle covered by a single beam the outcome of block 2030 is negative, and in block 2034 the bounds of the current search space are set to correspond to the quadrant 2102 and in block 2036 the size of the solid angle subrange is set to equal the size of solid angle subranges 2104, 2106, 2108, 2110. (Note that in some embodiments the current search space can be broken up into subranges of differing solid angle extent. Subranges may, for example be defined by ranges of x_step and y_step). Next it is found that the transmitting satellite's angular coordinates are in subrange 2110, in block 2034 the search space is set to subrange 2010, and in block 2036 the subrange size is set equal to the size of subranges 2112, 2114, 2116 and 2118. During a new execution of the loop commenced in block 2010, the angular coordinates of the transmitting satellite will be located in subrange 2118, which will be divided into subranges 2120, 2122, 2124, 2126 each of which corresponds to a single directivity pattern (beam). Subsequently the angular coordinates of the transmitting satellite are found in one of the subrange 2126 and the angular coordinates of peak gain for the directivity pattern corresponding to subrange 2126 is output in block 2032 as the angular coordinates of the transmitting satellite.

According to an alternative embodiment, rather than branching out of the loop commenced in block 2010 when it is determined in block 2014 that the summed signal energy for a $J^{TH}$ subrange exceeds the threshold, all M subranges are checked, then the subrange that had the maximum summed signal energy is selected and that subrange which has the maximum summed signal energy is compared to the threshold.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of antenna emulation and signal reception described herein. The non-processor circuits may include, but are not limited to, a radio receiver, a radio transmitter, signal drivers, clock circuits, power source circuits, and user input devices. As such, these functions may be interpreted as steps of a method to perform antenna emulation and signal reception. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Because many communication satellites are not in geosynchronous orbit, a directional antenna incorporated in the user's satellite terminal would need to track (follow the position) of the satellite as it passes along its orbit. A phased array antenna is a type of directional antenna that can be rapidly pointed electronically, i.e., by applying a predetermined pattern of phase shifts to the set of antenna elements that comprise the phased array antenna.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A wireless receiver comprising:
    an antenna array;
    a demodulator coupled to the antenna array;
    a summer coupled to demodulator; and
    a controller that controls the antenna array and the summer, and causes the antenna array to point in at least a first direction and a second direction different from the first direction while causing the summer to sum a first indication of signal strength produced by the demodulator when the antenna array is pointed in the first direction and a second indication of signal strength produced by the demodulator when the antenna array is pointed in the second direction, wherein the controller is programmed to establish the first direction during a first period within the duration of the code sequence and the second direction during a second period within the duration of the code sequence.

2. A method of receiving a radio signal, the method comprising:
    (a) receiving on an antenna array the radio signal comprising summing energy received on the antenna array during at least a first period and a second period;
    (b) identifying in a demodulator a signal indicative of a duration of a code sequence in the radio signal received on the antenna array in said step (a);
    (c) switching in a controller a beam of the antenna array in a first direction during the first period within the duration of the code sequence identified in the demodulator by said step (b); and
    (d) switching in a controller the beam of the antenna array in a second direction different from the first direction during the second period within the duration of the code sequence identified in the demodulator of said step (b).

3. The method according to claim 2 wherein the step (b) of identifying in the demodulator detects timing of the code sequence in part of a broadcast control channel or a satellite beacon.

4. The method according to claim 2 wherein the step (b) of identifying in the demodulator identifies the code sequence is within a single data frame.

5. The method according to claim 2
    wherein the method further comprises (e) switching in the controller the beam of the antenna array in a third direction different from the first direction and the second direction during a third period within the duration of the code sequence, wherein the second period is between the first period and the third period identified in the demodulator of said step (b), and
    wherein a total duration of time occupied by the first period, the second period and the third period is less than 20 milliseconds.

6. The method according to claim 2 wherein step (b) of identifying in the demodulator accommodates both the first period and the second period within the duration of a single symbol of the code sequence.

7. A method of narrowing down a direction to a transmitting device, the method comprising:
    (a) receiving on an antenna array a radio signal comprising summing energy received on the antenna array;
    (b) switching in a controller a beam of the antenna array in multiple directions within a solid angle portion of a larger solid angle search space during the receiving on the antenna array of said step (a), and
    wherein said step (a) of summing energy received in the receiving of said step (a) occurs while switching by the controller the beam of the phased array antenna in the multiple directions of said step (b) comprises the substep (a)(1) by the controller of obtaining a summed received energy signal; and
    (c) comparing in a comparitor of the controller the summed received energy signal from the antenna array obtained in said substep (a)(1) against a threshold to determine if the transmitting device is within the solid angle portion.

* * * * *